March 28, 1939.  M. H. CARPENTER  2,152,175
COUPLING DEVICE
Filed Sept. 19, 1936  2 Sheets-Sheet 1
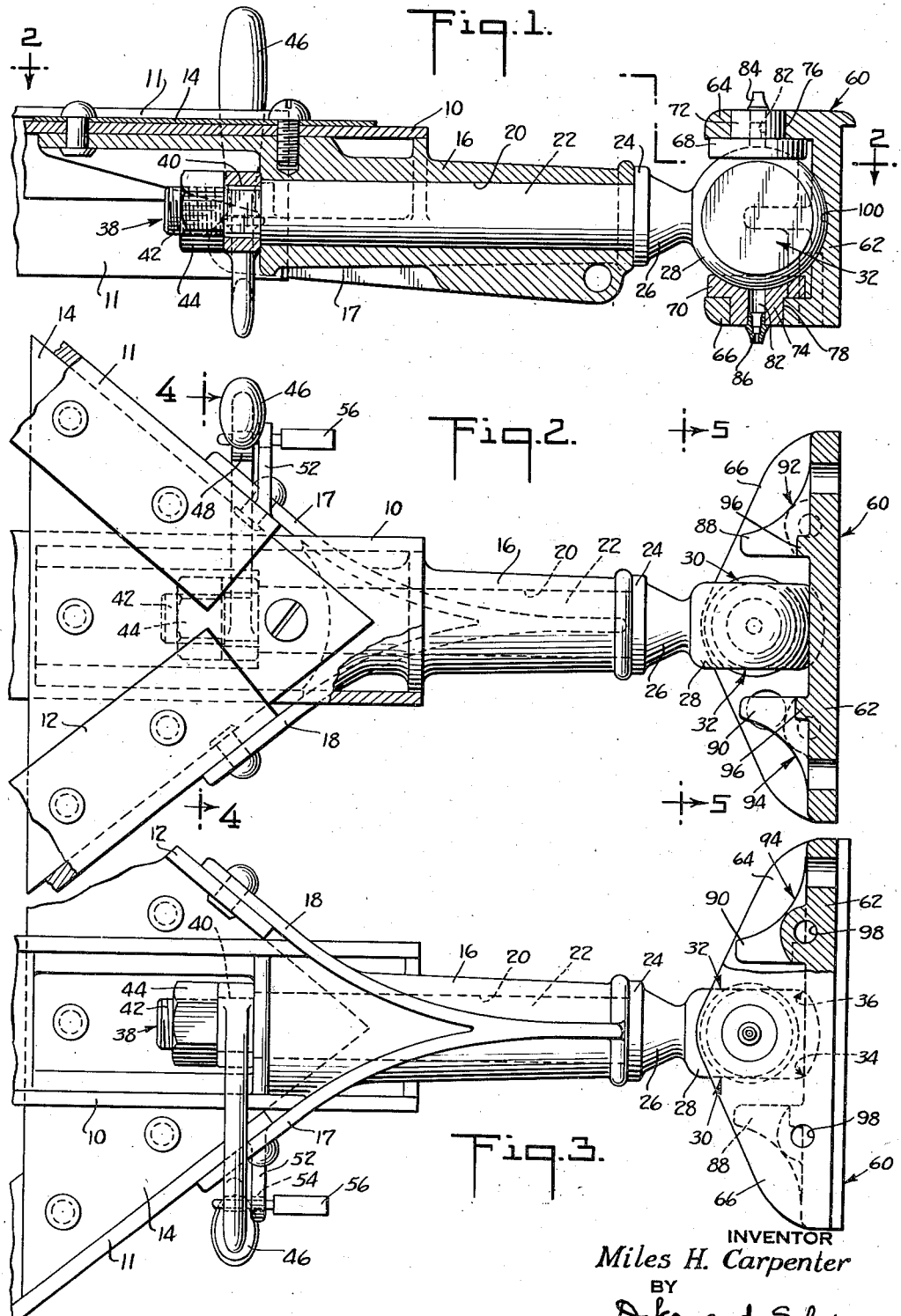
INVENTOR
Miles H. Carpenter
BY
Dyke and Schaines
ATTORNEYS March 28, 1939.　　M. H. CARPENTER　　2,152,175
COUPLING DEVICE
Filed Sept. 19, 1936　　2 Sheets-Sheet 2

INVENTOR
Miles H. Carpenter
BY
Dyke and Schaines
ATTORNEYS

Patented Mar. 28, 1939

2,152,175

UNITED STATES PATENT OFFICE 2,152,175

COUPLING DEVICE

Miles H. Carpenter, York, Pa.

Application September 19, 1936, Serial No. 101,536

9 Claims. (Cl. 280—33.15)

This invention relates to coupling devices for connecting road vehicles and particularly for coupling a trailer to a motor vehicle.

It is an object of this invention to provide a coupling means which shall be easy to attach and detach, capable of a wide range of universal movement, and solid in its connection so as to be free from rattles and play.

It is a further object of this invention to provide a draw-bar which will be secure against accidental detachment under operating conditions yet automatically disengaged in case one of the pulling or trailing vehicles turns over on its side.

Further objects will become apparent during the course of the specification.

In the drawings,

Fig. 1 is a longitudinal, vertical section of a coupling in accordance with my invention showing it in locked position;

Fig. 2 is a top plan view, corresponding to Fig. 1, part of this view being in horizontal section on the line 2—2 of Fig. 1;

Fig. 3 is a bottom plan view corresponding to Figs. 1 and 2;

Figure 4:
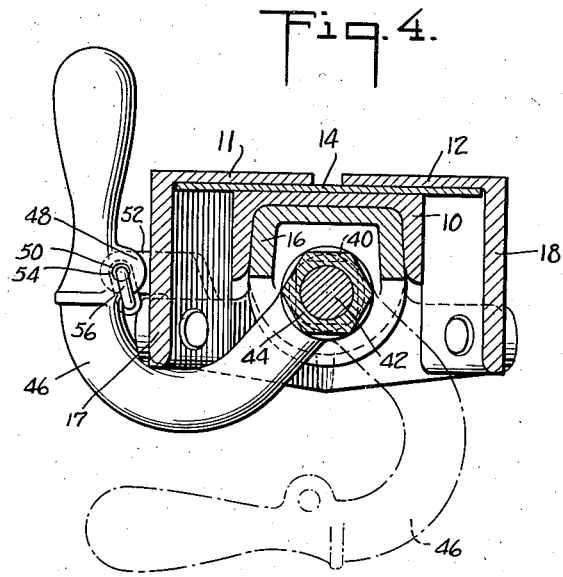
Fig. 4 is a vertical transverse section taken on the line 4—4 of Fig. 2.

In the embodiment of my invention illustrated in the appended drawings, three angle bars 10, 11, 12 are solidly attached to the body of the trailer. At their forward ends the outer bars 11, 12 are secured to a sleeve member 16 which has a pair of forked members 17, 18 for the reception of the said angle bars. The center bar 10 is secured to the top of member 16, and a triangular plate 14 connects and braces the three angle bars.

Through the main body of the sleeve member 16 there is a bore 20. A cylindrical bar 22 fits in the bore 20 and is provided with a shoulder 24 at the forward end of the sleeve. From this shoulder the bar 22 tapers inwardly to form a frusto-conical neck 26, immediately beyond which a flattened spherical head 28 is formed. This head is formed as a sphere except that on two opposite sides it has parallel flats 30, 32, and the junctures of the spherical surface and the flat surfaces are rounded off on a relatively small radius as shown at 34, 36.

At the rear end of the bar 22 there is a coaxial extension 38 of reduced diameter. This reduction takes place at the rear end of the sleeve 16. The inner portion 40 of this extension is non-circular, being shown in Fig. 4 as squared. Beyond this non-circular portion 40 a further extension 42 is provided, which portion is circular and is threaded for the reception of nut 44.

The handle 46 fits about the non-circular portion 40 and at that point is of the same thickness as the length of this portion 40. This handle 46 is curved as shown in Fig. 4 and has a lug 48 provided with a hole 50. A lug 52 extends out from the sleeve member 14 adjacent one position of the lug 48 and is provided with hole 54 which is aligned with the hole 50 in one position of the handle 46. A padlock 56, or other locking device, is passed through the hole in the lugs 48 and 52 to secure the handle in this position.

On the rear of the pulling vehicle a socket 60 is provided for the reception of the head 28. This socket consists of a base plate 62 having rearwardly extending top and bottom walls 64, 66. Milled-out cup members 68, 70 seat against the inner faces of the walls 64, 66 and have outwardly extending necks 72, 74 which have a close driven fit into holes 76, 78 in the top and bottom walls 64, 66. Preferably these cup members 68, 70 are provided with central bores 80, 82 in which lubrication fittings 84, 86 are provided. The cup members 68, 70 are so shaped that their opposed faces are concaved on a common radius which is the same as that of the head 24. Projecting fingers 88, 90 are provided on the base plate 62 intermediate the top and bottom walls 64, 66. The inner opposed edges of these finger members are spaced apart by a distance equal to the diameter of the head 28, and the outer sides of these finger members are curved out as indicated at 92 and 94. Suitable reinforcing ribs 96 join these fingers and the top and bottom walls.

Provision for attaching the socket member to the automobile structure may be made as indicated at 98. The base plate 62, top and bottom walls 64, 66, and ribs 96 are preferably made as a single casting. The base plate 62 is also milled out on the common radius of the cup members as indicated at 100.

Operation

Figure 5:
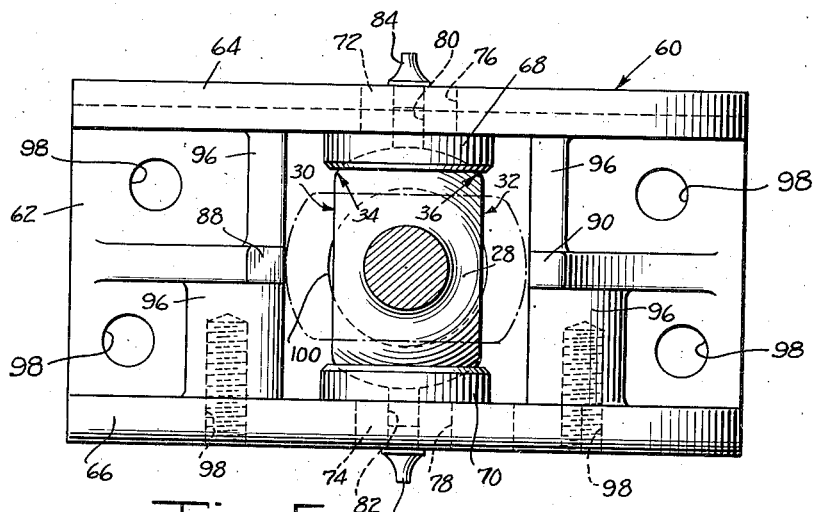
Fig. 5 is a rear elevation of the socket portion of the coupling as viewed on the line 5—5 of Fig. 2.

For attaching the trailer to the car the handle 46 is turned down to the dotted line position shown in Fig. 4. This turns the bar head to present its flat top and bottom. The trailer is then moved up to the car and the head inserted in the socket on the car. The fingers 88, 90 assist in positioning the head in introducing it into the socket and the recess 100 in the base plate accurately centers the head. The handle 46 is then rotated to the full line position shown in Fig. 4 which rotates the head to position B of Fig. 5 in which its spherical surface engages in the cup members 68, 70 top and bottom as well as the recess 100 at its front end. The handle 46 is then locked in place, as by means of the padlock 56.

The trailer is thus attached to the car in such way that it cannot move longitudinally with respect to the car unless it is turned approximately 80° rotatively. At the same time there is freedom for a large degree of universal pivoting and rotation between the car and the trailer. The tapered neck 26 provides full strength between the head and the bar because forces tending to break the bar and head apart are centered at the center of the head. At the same time this tapered neck construction allows a maximum range of universal movement.

Where the trailer is provided with a single pair of wheels and the sleeve for the draw-bar is rigidly secured to the trailer, which is the arrangement for which this invention is particularly adapted, the draw-bar must sustain a portion of the weight of the trailer and in some conditions of loading or road bumping must also hold the draw-bar end of the trailer down. The two cup members 68, 70, positioned at the top and bottom of the draw-bar head, sustain such downward load or upward force.

It is particularly important that this construction gives a tight coupling in which there is no play other than simple working clearance. If any play is present in the coupling it produces rattles and shakes. Furthermore in the case of a freely drawn road vehicle, not running on tracks, the presence of even a small amount of play produces "snaking". With a small amount of lateral play the trailer will start to move to one side, and even if the play is only a small fraction of an inch the sway to the side will be magnified through the elasticity of the trailer body, axle, spring, tires, and other parts. This elasticity will then pull the trailer back to the other side and in its momentum it will sway to a considerable degree. The repetition of this process tends to whip the rear end of the automobile from side to side and results in a dangerous condition of bad steering.

Because the cup members are formed as separate parts from the socket casting they can readily be formed of high quality steel and be carefully milled out and then inserted in the main casting. The provision of integral extensions on the cup members at right angles to the line of pull, these extensions being fitted into holes in the casting, provides a strong construction for resisting the pulling force.

While a large range of rotational movement between the car and the trailer is permitted it will be seen that if one is rotated through something like 80° with respect to the other the two will be automatically disengaged. This provides an automatic safety factor in that if, for instance, the trailer wheel should run over the edge of a bridge and the trailer overturn it will not pull the car off the bridge with it but will automatically disengage. The fact that there is a small angular range in which the two parts can disengage rather than having a single critical angle where the draw-bar is free to move in or out is of assistance for ease of engaging and disengaging, both in normal use and in case of one of the vehicles overturning.

While I have illustrated and described one preferred embodiment of my invention it will be realized that same is capable of many variations and different embodiments, while still retaining all or part of the substance of my invention. Hence I wish to be limited only by the scope of the appended claims.

I claim:

1. A socket for a draw-bar head generally spherical but having one diameter reduced, comprising a vertical base plate, a pair of rearwardly extending flanges thereon, co-axial bores in said flanges, and a pair of concave cups having flat backs with reduced extensions thereon opposite their concavities seated flat against the inner faces of said flanges with their extensions fitting in said bores.

2. Device of claim 1 in which said concavities are concentric with the same radius as the radius of the spherical part of said draw-bar head, and the rear face of the base plate is concave on the same center and with the same radius as the cups.

3. Device of claim 1 in which a pair of fingers are provided extending out intermediate the flanges and spaced apart by substantially the diameter of the cup concavities.

4. A coupling device comprising a sleeve rigidly attached to a trailer and a socket member rigidly attached to a motor vehicle, a draw-bar rotatively mounted in said sleeve, a generally spherical head on said draw-bar with one diameter thereof reduced, means for rotating said draw-bar and head through approximately ninety degrees, means for locking said draw-bar with the reduced diameter of said head vertical, top and bottom flanges on said socket member, cup members on the inner faces of said flanges having concentric concavities of the same radius as the spherical part of said head, and the rearward opening between said cup members being at least as great as the reduced diameter of said head.

5. Device of claim 4 in which said head is symmetrically flatted with rounded edges where the flats meet the spherical surface.

6. Device of claim 4 in which said socket member is made concave at its inner rear face on the same center and with the same radius as said cups.

7. Device of claim 4 in which said socket member is made concave at its inner rear face on the same center and with the same radius as said cups and positioning fingers extend rearwardly at each side between the top and bottom walls spaced apart by substantially the spherical diameter of said draw-bar head.

8. A coupling device comprising a draw-bar, a head on said draw-bar, a socket in which said head is receivable, a sleeve in which said draw-bar is rotatively mounted, a shoulder on said draw-bar at the end toward said head, a non-circular extension on said draw-bar at the end away from said head, and a threaded extension therebeyond, the length of the draw-bar from shoulder to first named extension being the same as the length of the sleeve, a handle fitting said non-circular extension and of a size larger than the sleeve bore, and a nut on said threaded extension securing said handle.

9. A coupling device comprising a socket and a bar member having a head, said head being generally spherical but having one reduced diameter, the bar extending radially from said head and at right angles to the reduced diameter of the head, the neck of said bar adjacent the head being considerably smaller than the diameter of the head, said socket providing opposed concentric cups having the same radius as the spherical head and spaced apart by less than the full diameter of the head but not less than the reduced diameter thereof, thereby allowing insertion or withdrawal of the head when in one range of axial rotation thereof and holding same against any displacement of the center of the head with respect to the socket when in another range of axial rotation thereof, said cups being also spaced apart materially more than the thickness of the neck of the bar, allowing swinging in one plane, the space between the cups being open at the sides to allow swinging in a plane perpendicular to the first-mentioned plane.

MILES H. CARPENTER.